Dec. 15, 1925.

H. C. HAYES 1,565,361

METHOD OF AND APPARATUS FOR DETERMINING THE DIRECTION OF WAVE ENERGY

Filed Jan. 31, 1922

Inventor
Harvey C. Hayes

By

Attorney

Patented Dec. 15, 1925.

1,565,361

UNITED STATES PATENT OFFICE.

HARVEY C. HAYES, OF ANNAPOLIS, MARYLAND.

METHOD OF AND APPARATUS FOR DETERMINING THE DIRECTION OF WAVE ENERGY.

Application filed January 31, 1922. Serial No. 533,091.

*To all whom it may concern:*

Be it known that I, HARVEY C. HAYES, a citizen of the United States, residing at Annapolis, in the county of Anne Arundel and State of Maryland, have invented certain new and useful Improvements in Methods of and Apparatus for Determining the Direction of Wave Energy, of which the following is a specification.

My invention relates generally to the determination of the direction of wave energy, and more particularly to the determination of the direction of sound waves, or energy converted into sound for the purpose of observation.

An object of the invention is to provide an instrument either acoustical or electrical in characteristic, in which a pilot sound may be obtained for comparison with the energy being observed, whereby its direction may be determined with great precision.

Another object of the invention is to provide an instrument in which wave energy may be accurately binaurally centered.

A further object of the invention is the provision of means whereby two energy paths leading from a binaural compensator may be either inter-connected or made separate and distinct.

With these and other objects in view, the invention consists in the construction, combination and arrangement of parts as will be hereinafter described.

Figure 1:
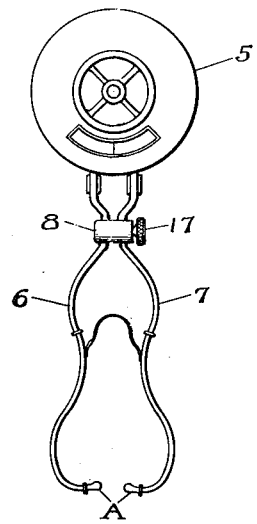
Figure 2:
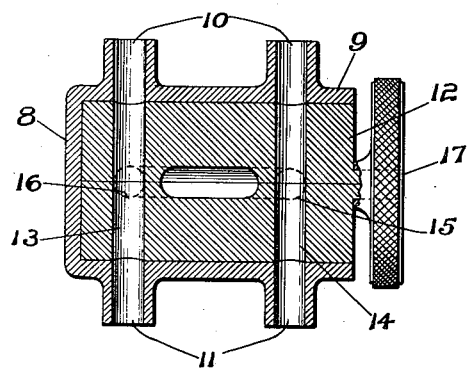
Figure 4:
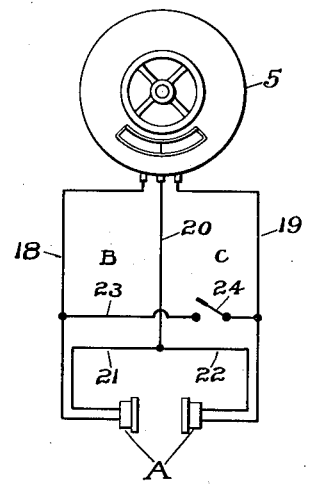
Figure 3:
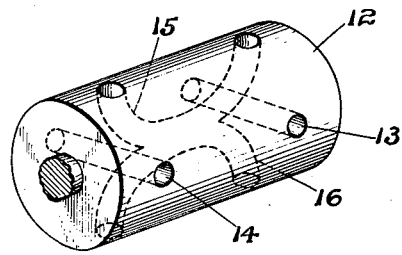
Figure 3:

Reference is to be had to the accompanying drawings forming part of this specification, in which like reference characters indicate corresponding parts throughout the several views, and in which Figure 1 is a view showing the application of my invention to an acoustical compensator, Fig. 2 is a sectional view of an acoustical switch employed, Fig. 3 is a perspective view of the inner member of the switch, and Fig. 4 is a view of an electrical device.

That the construction and operation of my device may be clearly understood, I shall first briefly describe the method of determining the direction of wave energy through the operation of the so-called "binaural principle" in combination with which my improvement is used.

Apparatus for the above purpose usually consists of two or more receivers of wave energy, the responses of which are carried to a compensator through energy conducting paths and thence through the compensator to the operator's ears where, if the energy response is not already in the form of sound, it is transferred into sound by means of telephone receivers or other suitable responsive device.

The means of receiving sound waves may be either acoustical or electrical. If acoustical sound receivers are employed, the energy conducting paths are usually metal tubes and the compensator serves as an extension of these air conducting paths, the design being such that the length of these paths, included within the compensator, can be varied. If electrical sound receivers, or microphones, are employed the energy paths connecting the microphones to the compensator are electrical conductors.

Either of two types of compensators may be used; namely, an electrical compensator whereby the time of transit of the responses of the sound receivers through the compensator can be varied by introducing into their respective circuits more or less of the retardation elements included within the compensator; or an electrical-acoustical compensator wherein by means of marine telephone receivers the electrical responses of the microphones are transformed into sound before passing through the compensator.

The energy receivers are spaced some distance apart and the conducting paths from the receivers are so arranged and grouped that the responses from one-half of the receivers come to one ear and from the other half of the receivers to the other ear. The function of the compensator is to delay the relative time of transit of the responses of the two receivers, or groups of receivers, in such a way and by such an amount that they will arrive at the two ears simultaneously. Under such conditions the sound will appear centered in the operator's head or, in other words, the sound will be binaurally centered.

If the adjustment of the compensator is such that the responses of the receivers, or groups of receivers, connected with the right ear arrive before the corresponding responses in the other receiver, or group of receivers, reach the left ear, the sound will appear to the operator to be located on the side to which the responses of the receivers first arrive. The operation of the binaural sense is such that a sound seems to be located on the side carrying the ear that first receives the sound impression.

The particular adjustment of the compensator necessary to binaurally center a sound depends upon the direction of the sound with respect to a line joining two receivers, or groups of receivers, and, as a result, the adjustable part of the compensator can be calibrated to give the direction of the sound with respect to the line of receivers. Further, having provided the compensator with an accurate scale, the accuracy with which the operator can determine the direction of the wave energy to which the receivers are subjected depends upon the accuracy with which he can judge when the sound is binaurally centered. In practice the operator varies the adjustment of the compensator switch back and forth, thereby causing the sound to appear to shift to the left and right and, by decreasing the amplitude of this motion, he finally arrives at such an adjustment of the compensator switch that the sound appears to be centered.

If an arrangement can be made whereby the operator can "flash" a sound that is equivalent to one accurately binaurally centered, he can then determine the direction of the wave energy with great precision by making the adjustment of the compensator for binaural centering such that the pilot or "flashed" sound and the binaurally observed sound appear to coincide in direction. I accomplish this purpose by inserting in the conducting paths leading from the compensator a means whereby the energy being observed may, at the will of the operator, be intermingled for direct observation to form a pilot sound, or maintained separated for binaural observation, as will be described more in detail. This permits of using the same energy for a pilot sound as that being observed, a decided advantage, as the only difference in characteristics to occupy the operator's attention is that of apparent direction, which feature is herein usefully employed.

Referring more particularly to Figure 1 of the drawings, in which I have illustrated an acoustical type device, 5 indicates any standard make of compensator of either type above described, from which conducting tubes 6 and 7 lead to any design of listening devices A. As the compensator and listening devices are of conventional design a detailed description of their construction will be superfluous.

The main feature of my invention is a valve 8, shown in detail in Figs. 2 and 3, which is placed between and connects the tubes 6 and 7 as shown in Figure 1. This valve consists of an outer or stationary member 9 having inlet ports 10 and outlet ports 11 arranged on opposite sides and in alignment, and an inner or rotatable member 12 snugly fitted within the member 9. This inner member 12 is provided with straight parallel passage ways 13 and 14 extending therethrough so arranged that they may connect with the ports 10 and 11, and has connected curved passages 15 and 16 forming a double Y conducting path within the member 12 at right angles to the parallel passage ways 13 and 14, so that by rotating the inner member 12 by the handle 17 connected therewith either set of passages may be brought into registration with the ports 10 and 11. The openings through the member may be more clearly seen in Fig. 3. If the position of the inner member is such that the passage ways 13 and 14 are in alignment with the ports the sound is conducted separately through the conducting tubes, while if the passages 15 and 16 are aligned with the ports, the sound is centered and reaches the listener's ears in phase. It is this centered sound that serves as a pilot.

To determine with great accuracy the direction from which sound is received the operator adjusts the compensator until the sound is as accurately centered as the binaural sense will permit. He then rotates the valve 12 bringing the passages 15 and 16 into registration with the ports 10 and 11 producing the pilot sound which reaches the two ears simultaneously. It being known that this sound is accurately centered, adjustment of the compensator is made as before until the pilot and incoming sounds are in phase. The reading of the compensator scale, which may be calibrated in any desired unit, after the two sounds are brought into coincidence, will indicate the direction of the sound source.

In Fig. 4, I have shown an electrical device in which the listening device A are connected one in series with each of the branches of compensator 5 through the conductors 18, 19, 20, 21 and 22, forming circuits B and C, the conductor 20 being common to both circuits. The conductors 18 and 19 are connected by a metallic circuit 23 which is opened and closed by a switch 24 to permit of observing either binaurally or direct.

The general operation of this type of device is the same as with the acoustical type. The incoming sound is centered binaurally by adjustment of the compensator, after which the switch 24 is closed connecting the listening devices in parallel and causing the sound to arrive at the two ears at the same time, which sound serves as the pilot. Coincidence between the pilot and incoming sound is obtained by further adjustment of the compensator and the direction determined from the reading of the scale as in the previous type described.

It is understood that the above description and accompanying drawings disclose only the general and preferred embodiment of my invention and that various minor changes in details of construction, proportion, and arrangement of parts may be resorted to within the scope of the appended claims and without sacrificing any of the advantages of my invention.

Having fully described my invention what I desire to secure by Letters Patent is:—

1. A receiver of wave energy including means for binaurally observing incoming energy, and means operable at the will of the operator for intermingling the energy of the two paths.

2. A receiver of wave energy including means for binaurally observing incoming energy, means for compensating for observed phase differences between the energy of the two paths, and means operable at the will of the operator to intermingle the energy of the two paths.

3. A receiver of wave energy including two paths conducting independently received energy to the two ears of an operator, and means operable at the will of the operator to intermingle the energy of the two paths.

4. A receiver of wave energy including two paths conducting independently received energy to the two ears of an operator, means for compensating for observed phase differences in the energy of the two paths, and means operable at the will of the operator to intermingle the energy of the two paths.

5. A receiver of wave energy including two paths conducting independently received energy to the two ears of an observer, and a valve operable at the will of the observer to intermingle the energy of the two paths.

6. A receiver of wave energy including two paths conducting independently received energy to the two ears of an observer, means for compensating for observed phase differences in the energy of the two paths and means operable at the will of the observer to intermingle the energy of the two paths.

7. A binaural receiver of wave energy having a valve operable at the will of the observer to intermingle the energy of the two paths.

8. The precision method of determining the direction from which wave energy proceeds which consists of observing the receipt of said energy binaurally, compensating for any binaural difference observed, comparing the resulting binaural centering with a direct observation of the same energy, and correcting the binaural centering to coincidence with said direct observation.

9. The method of determining the direction from which wave energy proceeds which consists of binaurally observing and centering said energy, comparing the result with a direct observation of said energy and adjusting the binaural centering to bring about coincidence between the binaural and direct observations.

HARVEY C. HAYES.